Dec. 13, 1938.  E. VINCENTI  2,140,252
SHOCK ABSORBER
Filed Sept. 28, 1937   2 Sheets-Sheet 1

Edward Vincenti
INVENTOR.

BY *CASnowLeo*
ATTORNEYS.

Dec. 13, 1938.  E. VINCENTI  2,140,252
SHOCK ABSORBER
Filed Sept. 28, 1937  2 Sheets-Sheet 2

Edward Vincenti
INVENTOR.
BY C.A.Snow&Co.
ATTORNEYS.

Patented Dec. 13, 1938

2,140,252

UNITED STATES PATENT OFFICE 2,140,252

SHOCK ABSORBER

Edward Vincenti, Valletta, Malta

Application September 28, 1937, Serial No. 166,079½

2 Claims. (Cl. 267—34)

This invention aims to provide a novel shock absorber for vehicles, wherein, through relative movement between slidably interengaged cylinders, a floating piston, springs, and the transfer of liquid, shocks may be taken up either when the vehicle body is moved downwardly with respect to the axle, or upon the rebound.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
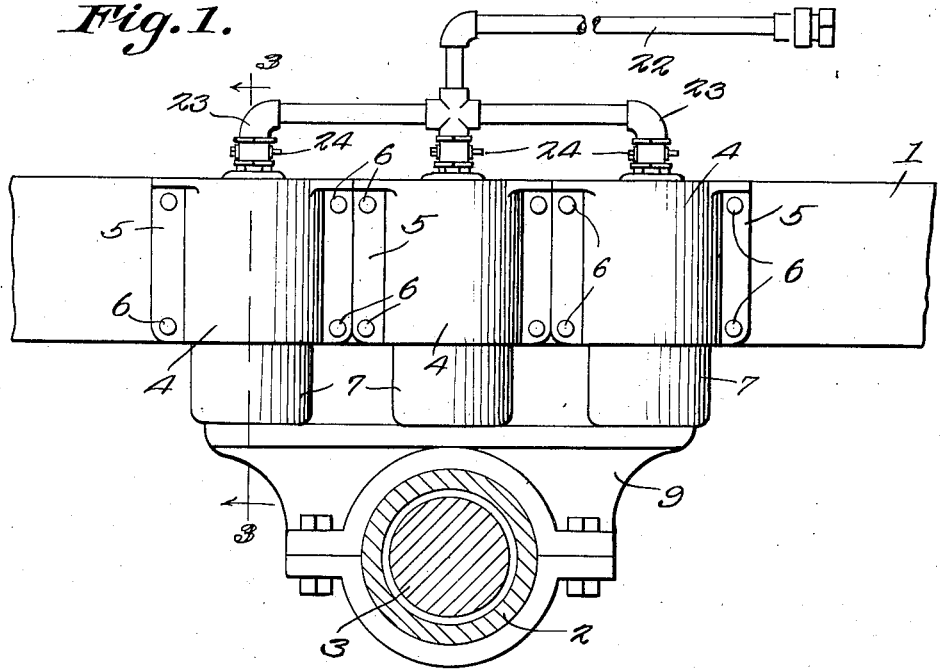
Fig. 1 shows in elevation, a device constructed in accordance with the invention.
Figure 2:
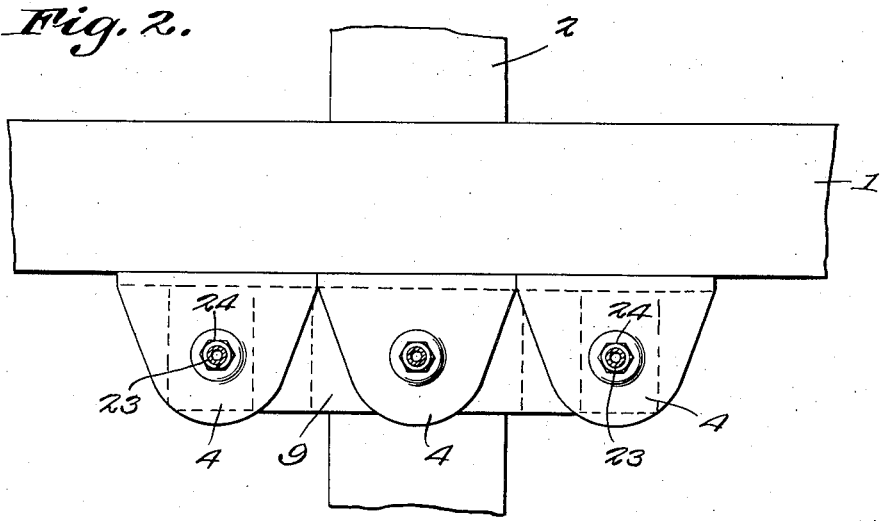
Fig. 2 is a top plan.
Figure 3:
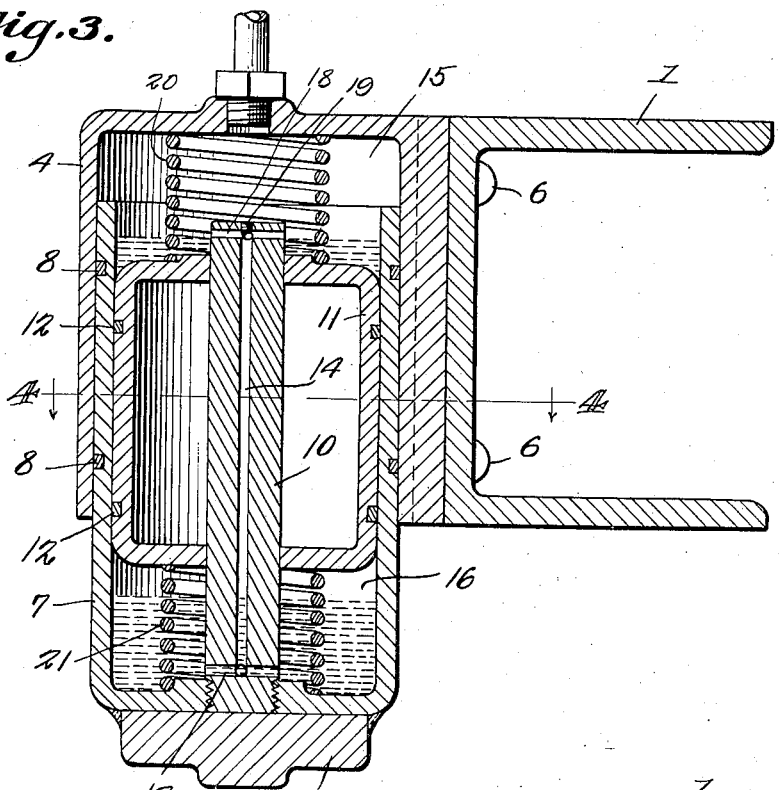
Fig. 3 is a section on the line 3—3 of Fig. 1.
Figure 4:
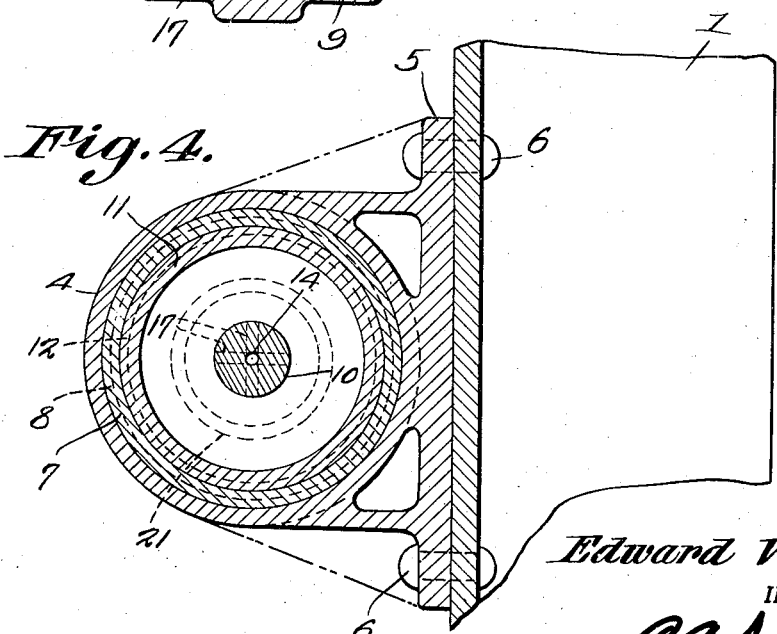
Fig. 4 is a section on the line 4—4 of Fig. 3.

In the accompanying drawings, the numeral 1 designates any accessible part of a vehicle, such as the chassis bar; the axle structure includes an axle housing 2 and an axle 3, although the axle structure may be of any desired form depending upon where the shock absorber is placed on the vehicle, and upon the make and construction of the vehicle.

Any desired number of inverted cup-shaped first cylinders 4 are provided, each cylinder having a base plate 5 secured at 6 to the vehicle frame 1. Although three cylinders are shown in the drawings, it will be understood that there may be as many or as few of these cylinders as is desired. Cup-shaped second cylinders 7 are mounted for reciprocation in the first cylinders 4, and in order to secure a tight joint between the relatively movable cylinders 7 and 4, the cylinders 7 may be supplied with packing rings 8. The cylinders 7 and the cylinders 4 have relative longitudinal sliding movement with respect to each other, in telescoped relation. The cylinders 2 may be connected by a foot 9 to the axle structure 2—3.

The numeral 10 marks a post or guide, having its lower end secured in the bottom of each of the second cylinders 7. On the post or guide 10, a hollow piston 11 is mounted for reciprocation. The piston 11 slides closely in the cylinder 7 and a tight joint between these parts is effected by packing rings 12 carried by the piston 11. The hollow floating piston 11 forms an upper chamber 15 in the upper end of the cylinder 7 and in the upper end of the cylinder 4. Similarly, a lower chamber 16 is formed, below the piston 11, in each cylinder 7.

The post or guide 10 is supplied with an axially longitudinal bore 14. The guide or post 10 has transverse ducts 17 and 18, communicating, intermediate their ends, with the bore 14. The upper duct 18 communicates with the upper chamber 15, and the lower duct 17 communicates with the lower chamber 16. A screw plug 19 may be mounted in the upper end of the post or guide 10, in alignment with the longitudinal bore 14, to facilitate cleaning of the bore 14.

A compression spring 20 is located in the upper chamber 15, the lower end of the spring 20 abutting against the upper end of the piston 11, and the upper end of the said spring abutting against the top of the cylinder 4. In the lower chamber 16 is located a compression spring 21. The lower end of the compression spring 21 abuts against the bottom of the cylinder 7, and the upper end of the compression spring 21 abuts against the lower end of the piston 11.

Any desired means may be supplied for furnishing oil or other liquid to the structure described. If desired, a supply pipe 22 may be provided, the same having branches 23 connected to the upper ends of the cylinders 4. Valves 24 may be interposed in the branches 23, whereby the operation can admit oil or other liquid at will.

In practical operation, when relative vertical movement takes place between the axle structure 2—3 and the vehicle frame 1, there will be a corresponding relative movement between the cylinders 7 and 4. The springs 20 and 21 will be compressed, and the piston 11 will have sliding movement in the cylinder 7. A variable pressure will be created in the chambers 15 and 16, and there will be a transfer of liquid, through the ducts 17 and 18 and the bore 14 of the post or guide 10, between the chambers 15 and 16.

The springs 20 and 21, supplemented by the action of the oil or other fluid, as it is transferred between the chambers 16 and 15, serve to create a cushioning effect which will obviate shocks. The device is simple in construction but will be found thoroughly effective for the ends in view. It will remain in working condition for a long time, without expert attention and will be well adapted to withstand the severe usage to which shock absorbers are subjected.

Having thus described the invention, what is claimed is:

1. In a shock absorber, the combination of a fixed cylinder having an open end, a second cylinder having an open end telescoped in said first cylinder for sliding movement and contacting its inner surface, a post secured to said second cylinder in axial alinement therewith, a piston slidable on said post in said second cylinder contacting its inner surface and defining chambers at the opposite ends of the piston, and compression springs in said chambers engaging the inner end of said cylinders and the adjacent ends of said piston.

2. In a shock absorber, the combination of a fixed cylinder having an open end, a second cylinder having an open end telescoped in said first cylinder for sliding movement and contacting its inner surface, a post detachably secured to said second cylinder in axial alinement therewith, a piston slidable on said post in said second cylinder contacting its inner surface and defining chambers at the opposite ends of the piston, compression springs in said chambers engaging the inner ends of said cylinders and the adjacent ends of said piston, said post having a longitudinal bore communicating at its opposite end with said chambers, and means for supplying fluid to one of the chambers for transfer through said bore to and from the other chamber.

EDW. VINCENTI.